United States Patent [19]

Adachi et al.

[11] Patent Number: 4,936,637

[45] Date of Patent: Jun. 26, 1990

[54] ANTI-SKID APPARATUS FOR AN AUTOMOTIVE VEHICLE

[75] Inventors: Yoshiharu Adachi, Gamagoori; Masamoto Ando, Toyota; Hirochika Shibata, Kariya; Toshiya Shibata; Hiroaki Takeuchi, both of Toyota; Masashi Sawada, Chiryu; Hiroshi Toda, Kariya; Nobuyasu Nakanishi; Noboru Noguchi, both of Toyota, all of Japan

[73] Assignees: Aisin Seiki Kabushiki Kaisha, Kariya; Toyota Jidosha Kabushiki Kaisha, Toyota, both of Japan

[21] Appl. No.: 328,519

[22] Filed: Mar. 24, 1989

[30] Foreign Application Priority Data

Mar. 28, 1988 [JP] Japan ................... 63-74019
Aug. 30, 1988 [JP] Japan ................... 63-215836

[51] Int. Cl.⁵ .............................. B60T 8/32
[52] U.S. Cl. ......................... 303/116; 303/119
[58] Field of Search ........... 303/116, 119, 117, 61-63, 303/68-69, 110, 10-12

[56] References Cited

U.S. PATENT DOCUMENTS

| | | | |
|---|---|---|---|
| 3,524,684 | 8/1970 | Skoyles | 303/116 |
| 3,550,966 | 12/1970 | Leiber | 303/119 |
| 3,574,416 | 4/1971 | Skoyles | 303/116 |
| 3,731,980 | 5/1973 | Fink et al. | 303/119 |
| 3,819,236 | 6/1974 | Fink et al. . | |
| 3,927,914 | 12/1975 | Fink et al. . | |
| 4,090,739 | 5/1978 | Iio | 303/116 X |
| 4,099,793 | 7/1978 | Iio | 303/116 |
| 4,179,166 | 12/1979 | Sharp et al. | 303/116 X |
| 4,668,024 | 5/1987 | Nakanishi et al. . | |
| 4,779,935 | 10/1988 | Kuwana et al. . | |

FOREIGN PATENT DOCUMENTS 49-28307 7/1974 Japan .
61-282158 12/1986 Japan .

*Primary Examiner*—Douglas C. Butler
*Attorney, Agent, or Firm*—Burns, Doane, Swecker & Mathis

[57] ABSTRACT

An anti-skid apparatus for installation in a vehicle braking system having a master cylinder, a wheel brake cylinder and a primary fluid passage connecting these cylinders includes a changeover valve disposed in the primary fluid passage to selectively communicate the wheel brake cylinder with the master cylinder or with a reservoir, and a fluid pump for pumping a brake fluid from the reservoir and returning it to a portion of the primary fluid passage between the master cylinder and the changeover valve. The anti-skid apparatus further includes a control valve disposed in that portion of the primary fluid passage. The control valve comprises a piston slidably disposed in a housing, and a valve member slidably disposed in the piston and seatable on a valve seat with a cutout formed thereon. The control valve allows a flow of the brake fluid from the master cylinder and/or the fluid pump to the wheel brake cylinder through the changeover valve without restriction in normal braking operation. In the anti-skid operation, the control valve allows a restricted flow of the brake fluid through the cutout to reduce the increasing speed of the hydraulic pressure in the wheel brake cylinder.

15 Claims, 3 Drawing Sheets

ANTI-SKID APPARATUS FOR AN AUTOMOTIVE VEHICLE

BACKGROUND OF THE INVENTION

1. Field of the Invention

The present invention relates to an anti-skid apparatus for use in an automotive vehicle, and more particularly, to an anti-skid apparatus for installation in a vehicle braking system between a master cylinder and wheel brake cylinders to prevent the vehicle wheels from locking in braking operation.

2. Description of the Prior Art

As one of such anti-skid apparatus as described above, Japanese Patent Publication for Opposition in 1984 under Publication No. 49-28307 discloses an anti-skid apparatus wherein an input control valve and an output control valve are disposed in parallel with each other in a primary fluid passage connecting a master cylinder and a wheel brake cylinder, and is disposed a fluid pump for pumping a brake fluid from a reservoir connected to the output control valve and returning the pumped brake fluid via a pump passage to the primary fluid passage at a portion thereof between the the master cylinder and the input control valve.

In the above-described prior apparatus, a hydraulic pressure in the wheel brake cylinder is alternately increased and decreased in response to operation of the changeover valve during its anti-skid operation. When the hydraulic pressure in the wheel brake cylinder is to be decreased with the input control valve in its closed position, the hydraulic pressure in the above-described portion of the primary fluid passage is increased, since the pumped brake fluid is supplied to that portion where the hydraulic pressure is increased in response to depression of the brake pedal. Accordingly, when the hydraulic pressure in the wheel brake cylinder is to be increased with the input valve in its open position, the increasing speed of the hydraulic pressure in the wheel brake cylinder becomes high, so that the hydraulic pressure therein is increased exceedingly. To prevent this extreme rise of the hydraulic pressure in the wheel brake cylinder, it may be useful to provide the primary fluid passage with a throttle or a restrictor for reducing the hydraulic pressure, as in Japanese Patent Application laid open in 1977 under Publication No. 52-12869, which discloses an anti-skid apparatus wherein a solenoid operated changeover valve selectively placed in one of a first operating position for communication of the wheel brake cylinder with the master cylinder, and a second operating position for communication of the wheel brake cylinder with the reservoir, is disposed in the primary fluid passage, in lieu of the input and output control valves, and wherein a plurality of restrictors are disposed in the primary fluid passage. However, in the normal braking operation, the flow of the brake fluid from the master cylinder to the wheel brake cylinder will also be restricted by the restrictors, so that delay in braking operation will be caused.

In the anti-skid apparatus disclosed in Japanese Patent Application laid open in 1986 under Publication No. 61-282158, a cut-off valve is disposed in the primary fluid passage between the master cylinder and the changeover valve. The cut-off valve is provided with a restrictor for restricting the flow of the brake fluid when the cut-off valve is in its closed position, and associated with a piston one side of which is applied with the hydraulic pressure in the primary fluid passage between the master cylinder and the changeover valve, and the other side of which is applied with the hydraulic pressure between the changeover valve and the wheel brake cylinder. This piston is arranged to normally hold the cut-off valve in its open position and activate the cut-off valve in its closed position when the hydraulic pressure on the side of the wheel brake cylinder becomes lower than the hydraulic pressure on the side of the master cylinder by more than a predetermined value. Accordingly, in the anti-skid operation, the increasing speed of the hydraulic pressure in the wheel brake cylinder may be reduced. In this anti-skid apparatus, however, the restrictor might not be able to restrict the flow of the brake fluid effectively in the anti-skid operation, when the difference between the hydraulic pressure on the side of the wheel brake cylinder and that on the side of the master cylinder is small, since the cut-off valve is designed to keep a sufficient passage for the brake fluid in normal braking operation.

SUMMARY OF THE INVENTION

Accordingly, it is an object of the present invention to provide an anti-skid apparatus for an automotive vehicle wherein the increasing speed of the hydraulic pressure in the wheel brake cylinder is effectively controlled in the anti-skid operation, without causing any delay in normal braking operation.

It is another object of the present invention to provide an anti-skid apparatus for an automotive vehicle, having a control valve for restricting a flow of the brake fluid effectively in the anti-skid operation thereby to prevent extreme rise of the hydraulic pressure in the wheel brake cylinder in the anti-skid operation.

It is a further object of the present invention to provide an anti-skid apparatus wherein the flow of the brake fluid is restricted in the anti-skid operation so as to reduce the increasing speed of the hydraulic pressure in the wheel brake cylinder irrespective of possible pulsation of the pumped brake fluid from the fluid pump.

It is yet another object of the present invention to provide an anti-skid apparatus wherein the brake pedal is speedily released in the anti-skid operation.

It is yet further object of the present invention to provide an anti-skid apparatus having a control valve disposed in a primary fluid passage for restricting the flow of the brake fluid in the anti-skid operation and incorporating a check valve for returning therethrough the brake fluid to the primary fluid passage so as to simplify the hydraulic circuit.

In accomplishing these and other objects, an anti-skid apparatus for an automotive vehicle according to the present invention is installed in a vehicle braking system having a master cylinder and a wheel brake cylinder connected therebetween through a primary fluid passage. The anti-skid apparatus according to the present invention comprises a changeover valve disposed in the primary fluid passage and selectively placed in one of operating positions including a first operating position for communication of the wheel brake cylinder with the master cylinder, and a second operating position for communication of the wheel brake cylinder with a reservoir, the changeover valve being switched to one of the operating positions under the control of a controller when a vehicle wheel tends to be locked in braking operation, a fluid pump for pumping a brake fluid from the reservoir and returning the pumped brake fluid to the primary fluid passage at a portion thereof between the master cylinder and the changeover valve. In the above arrangement, the anti-skid apparatus according to the present invention further comprises a control valve disposed in the above-described portion of the primary fluid passage, the control valve comprising a housing defining therein a cylinder bore, a piston axially slidably disposed within the cylinder bore, the piston forming at one end thereof within the cylinder bore a first chamber communicating with the master cylinder and the changeover valve thereby to constitute a part of the primary fluid passage and the piston forming a second chamber communicating with the fluid pump at the other end of the piston within the cylinder bore, and a valve member associated with the piston and seatable on a valve seat formed around an open end of the primary fluid passage opening to the first chamber, the valve member being normally placed away from the valve seat and seated thereon to form a restrictor in the primary fluid passage when the pumped brake fluid is supplied from the fluid pump to the second chamber.

In the above-described anti-skid apparatus, the housing of the control valve preferably defines therein a stepped cylinder bore having a large-diameter bore and a small-diameter bore co-axially communicated with the large-diameter bore, and the piston preferably comprises a large-diameter portion axially slidably disposed within the large-diameter bore to form the second chamber therein, and a small-diameter portion axially slidably disposed within the small-diameter bore to form the first chamber therein.

In the above arrangement, the control valve may further comprise a spring for biasing the piston away from the valve seat.

In the above anti-skid apparatus, the piston preferably defines therein a valve chamber opening at least to the first chamber, the valve member being axially slidably disposed within the valve chamber and biased by a second spring toward the valve seat, and preferably a retainer is secured to the piston and arranged to hold the valve member axially movable and retain the valve member within the valve chamber.

In the above anti-skid apparatus, the piston may be provided with a check valve for allowing a flow of the pumped brake fluid into the first chamber through the valve chamber and blocking a flow of the brake fluid from the first chamber to the second chamber.

In the above anti-skid apparatus, the control valve may further comprise a second valve seat formed around another open end of the primary fluid passage opening to the first chamber.

In the above arrangement, the retainer may have a hole communicating with the valve chamber and a contact surface therearound seatable on the second valve seat, and the valve member preferably includes a protrusion extending through the hole of the retainer in spaced relationship therewith and seatable on the valve seat, the valve member and the retainer being normally placed away from the valve seat and the second valve seat respectively and seated thereon to form restrictors in the primary fluid passage when the pumped brake fluid is supplied from the fluid pump to the second chamber.

BRIEF DESCRIPTION OF THE DRAWINGS

The above stated objects and following description will become readily apparent with reference to the accompanying drawings, in which.

DESCRIPTION OF THE PREFERRED EMBODIMENT

Figure 1:
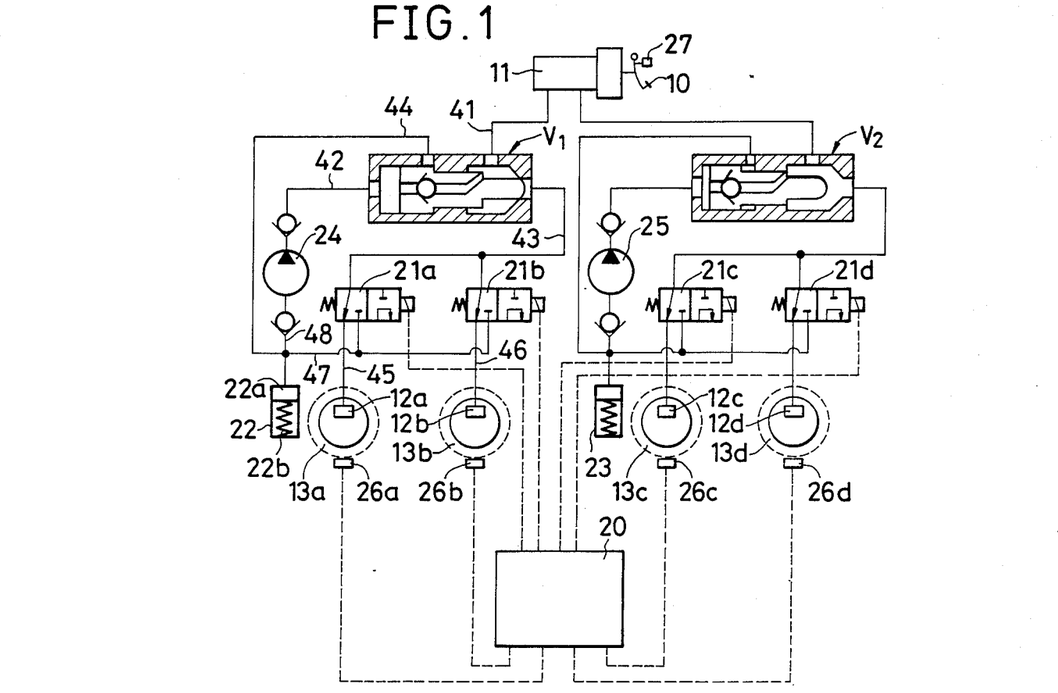
FIG. 1 is a schematic illustration of an anti-skid apparatus installed in a vehicle braking system according to a preferred embodiment of the present invention.

Referring to FIG. 1, there is schematically illustrated a braking system for an automotive vehicle which includes a master cylinder 11 to be activated by depression of a brake pedal 10. A hydraulic pressure developed in the master cylinder 11 is applied to wheel brake cylinders 12a, 12b, 12c and 12d provided for vehicle wheels 13a, 13b, 13c and 13d respectively.

The braking system includes an anti-skid apparatus which comprises speed sensors 26a, 26b, 26c and 26d for detecting the rotational speed of the vehicle wheels 13a, 13b, 13c and 13d respectively, a switch 27 for detecting a position of the brake pedal 10 and a controller 20 for producing electric control signals depending upon the output of the speed sensors 26a to 26d and the switch 27. The anti-skid apparatus further comprises four changeover valves 21a, 21b, 21c and 21d, two control valves V1 and V2, two reservoirs 22 and 23, two fluid pumps 24 and 25, and check valves connected to input and output ports of each of the fluid pumps 24, 25. The structure and function of the components shown at right side in FIG. 1 are substantially same as those at left side in FIG. 1.

The master cylinder 11 is communicated with the wheel brake cylinders 12a, 12b through a primary fluid passage comprising passages 41, 43, 45 and 46. In this primary fluid passage, the control valve V1 is disposed. That is, the master cylinder 11 is connected to the control valve V1 through the passage 41, and the control valve V1 is connected to the changeover valves 21a, 21b through the passage 43.

The changeover valves 21a, 21b are solenoid-operated directional control valves having three ports and taking two positions respectively, which are arranged to be energized in response to the electric control signals from the controller 20 to control the hydraulic pressure applied to the wheel brake cylinders 12a, 12b through the passages 45, 46. The changeover valves 21a, 21b are connected through a reservoir passage 47 to the reservoir 22, which is also connected to the fluid pump 24 through an inlet passage 48 via a check valve disposed therein. The reservoir 22 has a piston 22a received in a housing communicated with the reservoir passage 47, the inlet passage 48 and a recirculation passage 44 through a port. The piston 22a is biased by a spring 22b toward the port, and movable against biasing force of the spring 22b to define a chamber whose volume is variable. The fluid pump 24 is operated by an electric motor (not shown) which is actuated in response to the electric control signal from the controller 20. The fluid pump 24 is connected to the control valve V1 via a check valve which is disposed in a pump passage 42 and allows a fluid flow only in one direction from the fluid pump 24 toward the control valve V1. Accordingly, the brake fluid reserved in the reservoir 22 is pumped out by the fluid pump 24, and supplied to the control valve V1 in the anti-skid operation described hereinafter.

The changeover valves 21a, 21b are selectively placed in one of a first operating position and a second operating position respectively. In the first operating position, i.e. when the changeover valves 21a, 21b are not energized, the passages 45, 46 are held in communication with the passage 43, their communication with the reservoir passage 47 being blocked, so that the wheel brake cylinders 12a, 12b are communicated with the master cylinder 11 via the control valve V1, as long as the control valve V1 allows the flow of the brake fluid therethrough. In this position, therefore, the hydraulic pressure in the wheel brake cylinders 12a, 12b increases with the brake fluid delivered to the passage 43 from the master cylinder 11 via the control valve V1. In the second position, the passages 45, 46 are held in communication with the reservoir passage 47, their communication with the passage 43 being blocked, so that the wheel brake cylinders 12a, 12b are communicated with the reservoir 22. In this position, the hydraulic pressure in the wheel brake cylinders 12a, 12b drops with the brake fluid discharged from the wheel brake cylinders 12a, 12b to the reservoir 22. The changeover valves 21a, 21b are operated under the control of the controller 20. The solenoids of the changeover valves 21a, 21b are not energized in normal braking operation and energized in response to the electric control signals from the controller 20 in the anti-skid operation. The controller 20 receives a braking signal transmitted by the switch 27, and speed signals transmitted by the speed sensors 26a, 26b. Depending upon the speed signals, the controller 20 determines degree of slip of the vehicle wheels 13a, 13b on the road surface and generates the electric control signals in the manner known in the art. The fluid pump 24 is also controlled by the controller 20 and actuated when the anti-skid operation is started. The fluid pump 24 is actuated as long as the anti-skid operation continues.

Figure 2:
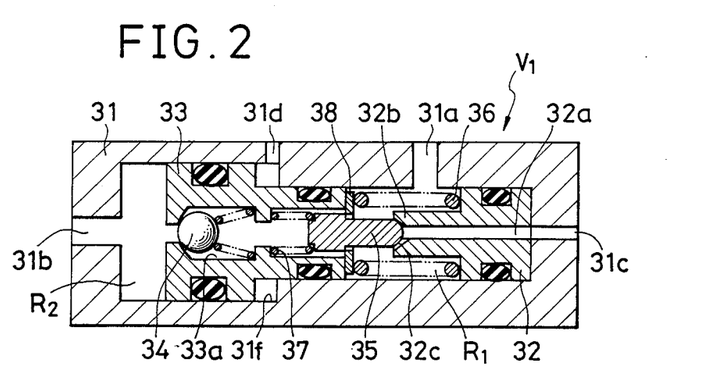
FIG. 2 is a sectional view of a control valve in the embodiment of FIG. 1.

As shown in FIGS. 1 and 2, the control valve V1 includes a housing 31, a seat member 32, a stepped piston 33, a check valve 34 and a valve member 35. In the housing 31, defined is a stepped cylinder bore 31f (hereinafter it merely refers to as a stepped bore 31f) having a small-diameter bore, in which the seat member 32 is liquid-tightly disposed and fixed to the bottom. The housing 31 is provided with a first port 31a for communication of the stepped bore 31f with the master cylinder 11 through the passage 41, a second port 31b for communication with the fluid pump 24 through the pump passage 42, a third port 31c for communication with the changeover valves 21a, 21b through the passage 43 and a fourth port 31d for communication with the reservoir 22 through the recirculation passage 44. This fourth port 31d may be opened to the atmosphere. The seat member 32 is provided axially with a through hole 32a communicating with the third port 31c and having an open end which opens to the stepped bore 31f, and formed with a valve seat 32b around the open end of the through hole 32a. The valve seat 32b is provided with a groove or a cutout 32c which forms a restrictor with the valve member 35 and allows a restricted flow of the brake fluid when the valve member 35 is seated on the valve seat 32b.

In the stepped bore 31f, liquid-tightly disposed is the stepped piston 33 whose large-diameter portion is axially slidably disposed within a large-diameter bore of the stepped bore 31f and whose small-diameter portion is axially slidably disposed within the small-diameter bore. The stepped piston 33 is, therefore, axially slidable within the stepped bore 31f by a predetermined distance, or untill the large-diameter portion comes into contact with the inner end of the housing 31. The stepped piston 33 is biased toward the inner end of the large-diameter bore by a spring 36 mounted between the seat member 32 and the stepped piston 33. Between the seat member 32 and the small-diameter portion of the stepped piston 33 within the stepped bore 31f, formed is a first chamber R1, to which the first port 31a and the third port 31c are opened. The large-diameter portion of the piston 33 forms within the stepped bore 31f a second chamber R2, to which the second port 31b is opened.

The stepped piston 33 is provided axially with a through hole 33a to define a valve chamber. Around one end of the through hole 33a at the large-diameter portion of the stepped piston 33, formed is a valve seat on which a spherical valve member is seatably disposed in the through hole 33a and biased by a spring. That is, a check valve 34 is provided in the through hole 33a at the large-diameter portion of the stepped piston 33, so as to allow the flow of the brake fluid from the second chamber R2 to the first chamber R1 and block the counter flow thereof.

The valve member 35 is fitted into the other end of the through hole 33a and slidably disposed therein, so that the valve member 35 can be advanced or retreated relative to the seat member 32 on the axis of the through hole 33a. The valve member 35 is biased toward the seat member 32 by a spring 37 which is mounted between the valve member 35 and the stepped piston 33 and which constitute the second spring according to the present invention, while the valve member 35 is retained within the valve chamber or the through hole 33a by a circular plate retainer 38 which is disposed between the stepped piston 33 and the spring 36 and through which the valve member 35 extends for seating on the valve seat 32b. Thus, when the stepped piston 33 is retreated from the seat member 32, the valve member 35 is placed away from the valve seat 32b, whereas when the stepped piston 33 is advanced to the seat member 32, the valve member 35 is seated on the valve seat 32b thereby to restrict the flow of the brake fluid from the first chamber R1 to the third port 31c and to allow the counter flow thereof without restriction. That is, the valve member 35 in the stepped piston 33 constitutes in its closed condition a valve which functions as a restrictor in the forward direction and which functions as a check valve in the reverse direction.

In the normal condition of the braking system described above, i.e. where the anti-skid apparatus is inoperative, the changeover valves 21a to 21d are inoperative, so that each third port 31c of the control valves V1, V2 is communicated with the corresponding wheel brake cylinders 12a to 12d, and the communication between the wheel brake cylinders 12a to 12d and the reservoirs 22, 23 is shut off. Further, the fluid pumps 24, 25 are inoperative so that the pressurized brake fluid is not supplied to each second chamber R2 in the control valves V1, V2, and also each stepped piston 33 is placed at its retreated position so that the valve member 35 is placed away from the seat member 32. Therefore, the brake fluid discharged from the master cylinder 11 by depression of the brake pedal 10 is fed to the wheel brake cylinders 12a to 12d via each first port 31a, first chamber R1, the valve comprising the valve member 35 and the seat member 32 in its open condition, third port 31c in the control valves V1, V2 and the changeover valves 21a to 21d. As a result, the normal braking operation without any delay may be obtained.

When an excessive amount of slip of each of the vehicle wheels 13a to 13d is detected by the controller 20 based upon the speed signal from each of the speed sensors 26a to 26d, the fluid pumps 24, 25 are activated and each of the changeover valves 21a to 21d is switched from its first operating position to its second operating position, whereby the passages 45, 46 are communicated with the reservoir passage 47, and their fluid communication with the passage 43 is blocked. Then, the brake fluid is discharged from the wheel brake cylinders 12a to 12d to the reservoirs 22, 23, and thus the hydraulic pressure in each of the wheel brake cylinders 12a to 12d is reduced. The fluid pumps 24, 25 are activated in response to the control signal from the controller 20, so that the brake fluid is fed to the control valves V1, V2 via the check valves.

When each of the changeover valves 21a to 21d is switched to its first operating position in response to the control signal from the controller 20, each of the wheel brake cylinders 12a to 12d is communicated with each third port 31c of the control valves V1, V2, whereby the pressurized brake fluid from the master cylinder 11 and the fluid pumps 24, 25 is fed to the wheel brake cylinders 12a to 12d so that the hydraulic pressure therein is increased. Thus, in this initial stage of the anti-skid operation, the pressurized brake fluid is supplied from each of the fluid pumps 24, 25 to each second chamber R2 of the control valves V1, V2 through the second port 31b, whereby the stepped piston 33 is pushed toward the seat member 32 and the valve member 35 is then placed on the valve seat 32b of the seat member 32 to restrict the flow of the pressurized brake fluid from the first chamber R1 to the third port 31c. Accordingly, in subsequence, the increasing speed of the hydraulic pressure of the brake fluid supplied to each of the wheel brake cylinders 12a to 12d is reduced by the restrictor of the cutout 32c. Thus, the increasing speed of the hydraulic pressure in each wheel brake cylinder is optimized. Each of the changeover valves 21a to 21d is controlled by the controller 20 so as to keep the hydraulic pressure in each of the wheel brake cylinders 12a to 12d within a suitable range in which the slip of each of the vehicle wheels 13a to 13d is held below a permissible limit, so that each vehicle wheel is prevented from being locked in the braking operation, whereby the vehicle is accurately braked.

When the brake pedal 10 is released in the anti-skid operation as described above, the hydraulic pressure in the first chamber R1 in each of the control valves V1, V2 comes to naught as the hydraulic pressure in the master cylinder 11 comes to naught. Therefore, even if the stepped piston 33 is placed at its advanced position as shown in FIG. 2, the valve member 35 of each of the control valves V1, V2 is placed away from the valve seat 32b against biasing force of the spring 37 by the pressurized brake fluid in each of the wheel brake cylinders 12a to 12d, which is fed into the first chamber R1 without restriction through each of the changeover valves 21a to 21d. Thus, the braking force may be speedily released. When the operation of each of the fluid pumps 24, 25 is stopped, the brake fluid in the second chamber R2, which is returned from the reservoirs 22, 23 and fluid pumps 24, 25, flows into the first chamber R1 through the check valve 34 in the through hole 33a, so that the stepped piston 33 is shifted toward the retreated position.

As has been described in the foregoing, according to the present embodiment, since the control valves V1, V2 are disposed in the portion of the primary fluid passage between the master cylinder 11 and the changeover valves 21a to 21d, so as to allow the flow of the brake fluid without restriction in the normal operation where the anti-skid apparatus is inoperative and to restrict the flow of the brake fluid in the anti-skid operation, the increasing speed of the hydraulic pressure in the wheel brake cylinders 12a to 12d may be optimized in the anti-skid operation, without occurrence of any delay in the normal braking operation.

Further, since the valve member 35 is provided in the stepped piston 33 of each of the control valves V1, V2, i.e. the stepped piston 33 having the large-diameter portion receiving the hydraulic pressure of the pumped brake fluid supplied from each of the fluid pumps 24, 25, and since a restrictor valve is formed by the above valve member 35 and the seat member 32, the stepped piston 33 is not shifted even if the hydraulic pressure supplied from each of the fluid pumps 24, 25 becomes lower than the hydraulic pressure in the master cylinder 11 due to a possible discharge pulsation of the fluid pumps 24, 25, so that the flow of the brake fluid is effectively restricted constantly.

Since the valve member 35 in each of the control valves V1, V2 is disposed in the stepped piston 33 movable in a forward direction and a rearward direction, and functions as a check valve for allowing the flow of the brake fluid from the third port 31c to the first chamber R1 without restriction, the braking force may be speedily released when the brake pedal 10 is released in the anti-skid operation, so that any unpleasant feeling in braking operation such as a dragging or the like is not caused.

In addition, since the through hole 33a is provided in the stepped piston 33 of each of the control valves V1, V2 to return the brake fluid discharged from each of the fluid pumps 24, 25 to the primary fluid passage through the check valve 34 disposed in the above through hole 33a, it is not necessary to provide each of the fluid pumps 24, 25 with a recirculation passage connected to the primary fluid passage, whereby the circuit is simplified.

Figure 3:
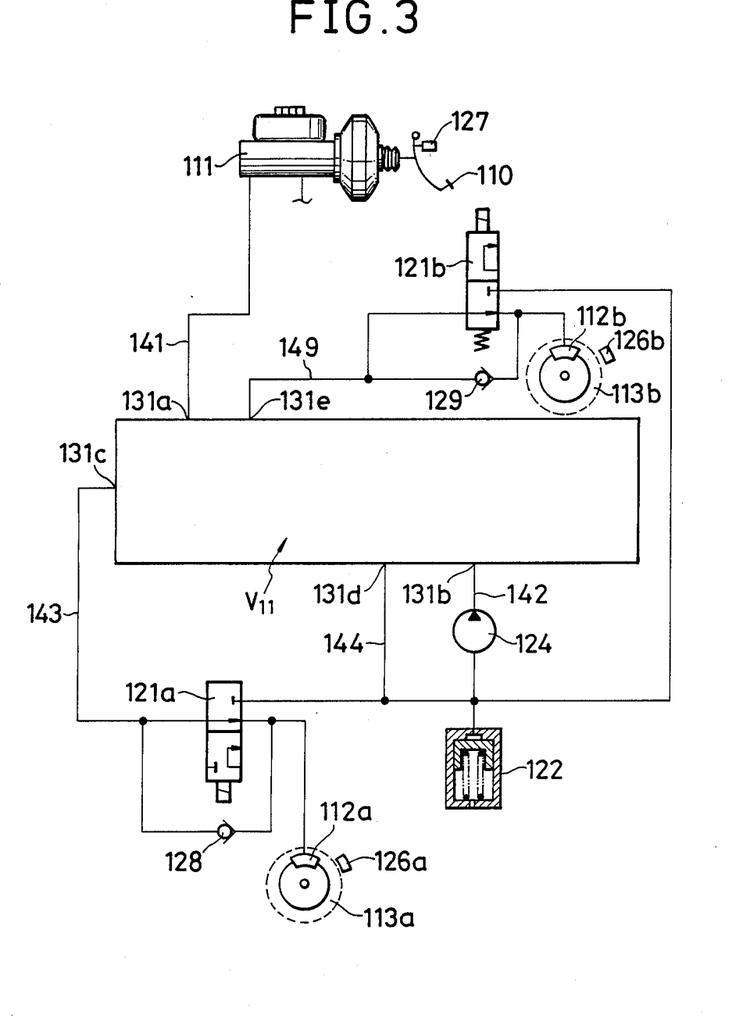
FIG. 3 is a schematic illustration of an anti-skid apparatus according to another embodiment of the present invention.

FIG. 3 shows another embodiment of the anti-skid apparatus according to the present invention. In this embodiment, a master cylinder 111, which is activated by depression of a brake pedal 110, is connected to each wheel brake cylinder through a hydraulic passage, and a hydraulic pressure to be supplied to each wheel brake cylinder is controlled by the anti-skid apparatus according to the present invention. In this embodiment, employed is a diagonal dual circuits system which consists of a pair of hydraulic circuits, one circuit for a left-hand front wheel brake cylinder 112a and a right-hand rear wheel brake cylinder 112b, and the other circuit for a right-hand front wheel brake cylinder and a left-hand rear wheel brake cylinder. Since both circuits are substantially same, only one circuit is illustrated in FIG. 3 in the interest of simplification.

The anti-skid apparatus as shown in FIG. 3 comprises two changeover valves 121a, 121b, a reservoir 122, a fluid pump 124, a control valve V11, two sensors 126a, 126b each for detecting the rotational speed of the corresponding one of vehicle wheels 113a, 113b, a switch 127 for detecting the depression of the brake pedal 110 and a controller (not shown) which is substantially same as the controller 20 in the aforementioned embodiment, and which is activated by the operation of the switch 127 in response to depression of the brake pedal 110. This controller detects the skid-condition of each of the vehicle wheels 113a, 113b in accordance with the output of each of the sensors 126a, 126b, and produces an electric control signal to each of the changeover valves 121a, 121b so as to accurately prevent the vehicle wheels from locking. The controller also produces an electric signal to a drive circuit of an electric motor (not shown) for driving the fluid pump 124.

Figure 4:
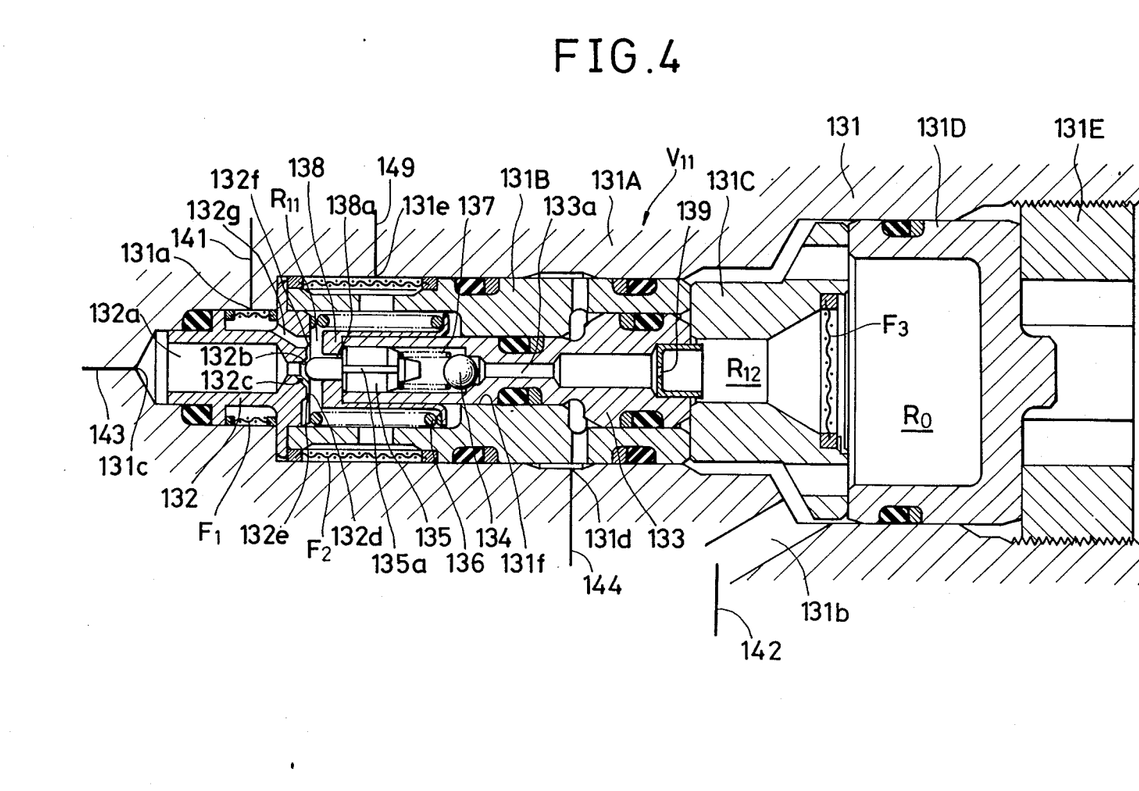
FIG. 4 is a sectional detail view of a control valve in the embodiment of FIG. 3.

The control valve V11, as shown in FIGS. 3 and 4, comprises a housing 131, a seat member 132, a stepped piston 133, a check valve 134 and a valve member 135. The housing 131 includes therein a cylinder body 131A, a cylinder 131B disposed in the cylinder body 131A together with the seat member 132, a holder 131C, a plug 131D and a screw 131E for holiding these components within the housing 131. The housing 131 is provided with a first port 131a communicating with the master cylinder 111 through a passage 141, a second port 131b communicating with the fluid pump 124 through a passage 142, a third port 131c communicating with the changeover valve 121a through a passage 143, a fourth port 131d which communicates with the reservoir 132 through a passage 144 and which may be opened to the atmosphere, and a fifth port 131e communicating with the changeover valve 121b through a passage 149. The housing 131 is defined therein with a stepped bore 131f for receiving the stepped piston 133. Filters F1, F2 are respectively provided on inner ends of the first and fifth ports 131a, 131e.

The seat member 132 is provided axially with a first through hole 132a communicating with the third port 131c and having an open end which opens to the stepped bore 131f, and formed with a tapered valve seat 132b around the open end of the first through hole 132a, and a flat valve seat 132d, which constituted a second valve seat according to the present invention, at a tip end of the seat member 132. The valve seat 132b is provided with a groove or a cutout 132c, and the valve seat 132d is provided with a cutout 132e communicating with the cutout 132c and a cutout 132f communicating with a second through hole 132g which is formed in the seat member 132 for communicating with the first port 131a.

In the stepped bore 131f, liquid-tightly disposed is the stepped piston 133 whose large-diameter portion is axially slidably disposed within a large-diameter bore of the stepped bore 131f and whose small-diameter portion is axially slidably disposed within the small-diameter bore and provided with a cylindrical retainer 138 having a flange portion at its end. The stepped piston 133 is, therefore, axially slidable within the stepped bore 131f by a predetermined distance, or untill the large-diameter portion comes into contact with the inner end of the cylinder 131B. The stepped piston 133 is biased toward the end of the large-diameter bore by a spring 136 mounted between the seat member 132 and the flange portion of the retainer 138. Between the seat member 132 and the small-diameter portion of the stepped piston 133 within the stepped bore 131f, formed is a first chamber R11, with which the first port 131a is communicated via the second through hole 132g and the cutout 132f and the third port 131c is communicated via the first through hole 132a. The large-diameter portion of the piston 133 forms within the stepped bore 131f a second chamber R12, with which the second port 131b is communicated. Between the second chamber R12 and the second port 131b, a filter F3 is disposed and a damper room Ro is formed within the plug 131D.

The stepped piston 133 is provided axially with a through hole 133a to define a valve chamber. In the through hole 133a through which the first chamber R11 communicates with the second chamber R12, an orifice 139 is disposed, and formed is a valve seat on which a spherical valve member is seatably disposed and biased by a spring 137, whereby a check valve 134 is provided in the through hole 133a, so as to allow the flow of the brake fluid from the second chamber R12 to the first chamber R11 and block the counter flow thereof.

The valve member 135 is fitted into the valve chamber or the through hole 133a at its side opening to the first chamber R11 and slidably disposed therein, so that the valve member 135 can be advanced or retreated relative to the seat member 132 on the axis of the through hole 133a. The valve member 135 is provided on its outer surface with a groove 135a for allowing the flow of the brake fluid therethrough. The valve member 135 is biased toward the seat member 132 by the spring 137 which is mounted between the valve member 135 and the check valve 134 and which constitutes the second spring according to the present invention, while the valve member 135 is retained within the through hole 133a by the retainer 138 into which the small-diameter portion of the stepped piston 133 is fitted. The retainer 138 is formed with a hole through which a protrusion of the valve member 135 extends for seating on the valve seat 132b, and is formed around that hole with a groove 138a which allows the flow of the brake fluid between the first chamber R11 and the through hole 133a. Thus, when the stepped piston 133 is retreated from the seat member 132, the valve member 135 is placed away from the valve seat 132b, whereas when the stepped piston 133 is advanced to the seat member 132, the valve member 135 is seated on the valve seat 132b therby to restrict the flow of the brake fluid from the first chamber R11 to the third port 131c and to allow the counter flow thereof without restriction. That is, the valve member 135 in the stepped piston 133 constitutes in its closed condition a valve which functions as a restrictor in the forward direction and which functions as a check valve in the reverse direction.

The retainer 138 associated with the small-diameter portion of the stepped piston 133 is placed away from the seat member 132 when the stepped piston 133 is retreated from the seat member 132. When the stepped piston 133 is advanced to the seat member 132, the retainer 138 is seated on the valve seat 132d of the seat member 132 with a throttle or a restrictor formed by the cutout 132f between the first chamber R11 and the first port 131a and also with another restrictor formed by the cutout 132e between the first chamber R11 and the fifth port 131e communicating with the changeover valve 121b.

Each of the changeover valves 121a, 121b is substantially same as each of the changeover valves 21a to 21d in the aforementioned embodiment except that the check valves 128, 129 are respectively disposed in parallel to the changeover valves 121a, 121b. The reservoir 122 and fluid pump 124 are also substantially same as the reservoirs 22, 23 and fluid pumps 24, 25 in the aforementioned embodiment respectively.

In the normal condition of the braking system of the above embodiment, i.e. where the anti-skid apparatus is inoperative, the changeover valves 121a, 121b are inoperative as shown in FIG. 3, so that the third port 131c of the control valve V11 is communicated with the left-hand front wheel brake cylinder 112a and that the fifth port 131e is communicated with the right-hand rear wheel brake cylinder 112b, and the communication between the wheel brake cylinders 112a, 112b and the reservoir 122 is shut off. Further, the fluid pump 124 is inoperative so that the pressurized brake fluid is not supplied to the second chamber R12 in the control valve V11, and also the stepped piston 133 is placed at its retreated position so that the valve member 135 and the retainer 138 are placed away from the seat member 132. Therefore, the brake fluid discharged from the master cylinder 111 by depression of the brake pedal 110 is fed to the first chamber R11 via the first port 131a, the second through hole 132g, and the valve comprising the retainer 138 and the valve seat 132d in its open condition, and then fed to the left-hand front wheel brake cylinder 112a via the valve comprising the valve member 135 and the valve seat 132b in its open position, the through hole 132a, the third port 131c, the passage 143 and the changeover valve 121a. Also, the brake fluid is fed to the right-hand rear wheel brake cylinder 112b via the valve comprising the retainer 138 and the valve seat 132d in its open position, the fifth port 131e, the passage 149 and the changeover valve 121b. As a result, the normal braking operatin without any delay may be obtained.

When an excessive amount of slip of each of the vehicle wheels 113a, 113b is detected by the controller (not shown) based upon the speed signal from each of the speed sensors 126a, 126b, the fluid pump 124 is activated and each of the changeover valves 121a, 121b is switched from its first operating position to its second operating position, whereby the wheel brake cylinders 112a, 112b are communicated with the reservoir 122, and their fluid communication with the control valve V11 is blocked. Then, the brake fluid is discharged from the wheel brake cylinders 112a, 112b to the reservoir 122, and thus the hydraulic pressure in each of the wheel brake cylinders 112a, 112b is reduced. The fluid pump 124 is activated in response to the control signal from the controller, so that the brake fluid is fed to the control valve V11.

When each of the changeover valves 121a, 121b is switched to its first operating position in response to the control signal from the controller, each of the wheel brake cylinders 112a, 112b is communicated with the third port 131c and the fifth port 131e of the control valve V11 respectively, whereby the pressurized brake fluid from the master cylinder 111 and the fluid pump 124 is fed to the wheel brake cylinders 112a, 112b, so that the hydraulic pressure therein is increased. Thus, in this initial stage of the anti-skid operation, the pressurized brake fluid is supplied from the fluid pump 124 to the second chamber R12 of the control valve V11 through the second port 131b, whereby the stepped piston 133 is pushed toward the seat member 132 and the valve member 135 is then placed on the valve seat 132b of the seat member 132 to restrict the flow of the pressurized brake fluid from the first chamber R11 to the third port 131c. At the same time, the retainer 138 is seated on the valve seat 132d to restrict the flow of the pressurized brake fluid from the first port 131a to the first chamber R11, and restrict the flow of the brake fluid from the first chamber R11 to the fifth port 131e. Accordingly, in subsequence, the increasing speed of the hydraulic pressure of the brake fluid supplied to each of the wheel brake cylinders 112a, 112b is reduced individually by each restrictor of the cutouts 132c, 132f respectively. Thus, the increasing speed of the hydraulic pressure in each wheel brake cylinder is optimized individually. Each of the changeover valves 121a, 121b is controlled by the controller so as to keep the hydraulic pressure in each of the wheel brake cylinders 112a, 112b within a suitable range in which the slip of each of the vehicle wheels 113a, 113b, is held below a permissible limit, so that each vehicle wheel is prevented from being locked in the braking operation, whereby the vehicle is accurately braked.

When the brake pedal 110 is released in the anti-skid operation as described above, the hydraulic pressure in the first chamber R11 in the control valve V11 comes to naught as the hydraulic pressure in the master cylinder 111 comes to naught. Therefore, even if the stepped piston 133 is placed at its advanced position, the valve member 135 of the control valve V11 is placed away from the valve seat 132b against biasing force of the spring 137 by the pressurized brake fluid in the left-hand front wheel brake cylinder 112a, which is fed into the first chamber R11 without restriction through the changeover valve 121a. Thus, the braking force may be speedily released. When the operation of the fluid pump 124 is stopped, the brake fluid in the second chamber R12, which is returned from the reservoir 122 and fluid pump 124, flows into the first chamber R11 through the check valve 134 in the through hole 133a, so that the stepped piston 133 is shifted toward the retreated position.

It should be apparent to one skilled in the art that the above-described embodiment is merely illustrative of but a few of the many possible specific embodiments of the present invention. For example, the changeover valve 21a of three ports-two positions solenoid-operated directional control valve can be substituted by a combination of an input control valve of two ports-two positions solenoid-operated directional control valve disposed between the passage 43 and the passages 45, 46 and an output control valve of two ports-two positions solenoid-operated directional control valve disposed between the passages 45, 46 and the passage 47. Or, the changeover valve 21a or 121a can be substituted by a three ports-three positions solenoid-operated control valve which can be placed in a third operating position for holding the hydraulic pressure in the wheel brake cylinder with all the ports shut-off. Numerous and various other arrangements can be readily devised by those skilled in the art without departing from the spirit and scope of the invention as defined in the following claims.

What is claimed is:

1. An anti-skid apparatus for an automotive vehicle for installation in a vehicle braking system having a master cylinder and a wheel brake cylinder connected therebetween through a primary fluid passage, comprising:

a changeover valve disposed in said primary fluid passage and selectively placed in one of a plurality of operating positions including a first operating position for communication of said wheel brake cylinder with said master cylinder, and a second operating position for communication of said wheel brake cylinder with a reservoir, said changeover valve being switched to one of said operating positions under the control of a controller when a vehicle wheel tends to be locked in braking operation;

a fluid pump for pumping a brake fluid from said reservoir and returning the pumped brake fluid to said primary fluid passage at a portion thereof between said master cylinder and said changeover valve;

a control valve disposed in said portion of said primary fluid passage, said control valve comprising a housing defining therein a cylinder bore, a piston axially slidably disposed within said cylinder bore, said piston forming at one end thereof within said cylinder bore a first chamber communicating with said master cylinder and said changeover valve thereby to constitute a part of said primary fluid passage and said piston forming a second chamber communicating with said fluid pump at the other end of said piston within said cylinder bore, and a valve member associated with said piston and seatable on a valve seat formed around an open end of said primary fluid passage opening to said first chamber, said valve member being normally placed away from said valve seat and seated thereon to form a restrictor in said primary fluid passage when said pumped brake fluid is supplied from said fluid pump to said second chamber, the restrictor never completely blocking the flow of fluid;

wherein said housing of said control valve defines therein a stepped cylinder bore having a large-diameter bore and a small-diameter bore co-axially communicated with said large-diameter bore, and wherein said piston comprises a large-diameter portion axially slidably disposed within said large-diameter bore to form said second chamber therein, and a small-diameter portion axially slidably disposed within said small-diameter bore to form said first chamber therein.

2. An anti-skid apparatus for an automotive vehicle as set forth in claim 1, wherein said control valve further comprises a spring for biasing said piston away from said valve seat.

3. An anti-skid apparatus for an automotive vehicle for installation in a vehicle braking system having a master cylinder and a wheel brake cylinder connected therebetween through a primary fluid passage, comprising:

a changeover valve disposed in said primary fluid passage and selectively placed in one of a plurality of operating positions including a first operating position for communication of said wheel brake cylinder with said master cylinder, and a second operating position for communication of said wheel brake cylinder with a reservoir, said changeover valve being switched to one of said operating positions under the control of a controller when a vehicle wheel tends to be locked in braking operation;

a fluid pump for pumping a brake fluid from said reservoir and returning the pumped brake fluid to said primary fluid passage at a portion thereof between said master cylinder and said changeover valve;

a control valve disposed in said portion of said primary fluid passage, said control valve comprising a housing defining therein a cylinder bore, a piston axially slidably disposed within said cylinder bore, said piston forming at one end thereof within said cylinder bore a first chamber communicating with said master cylinder and said changeover valve thereby to constitute a part of said primary fluid passage and said piston forming a second chamber communicating with said fluid pump at the other end of said piston within said cylinder bore, and a valve member associated with said piston and seatable on a valve seat formed around an open end of said primary fluid passage opening to said first chamber, said valve member being normally placed away from said valve seat and seated thereon to form a restrictor in said primary fluid passage when said pumped brake fluid is supplied from said fluid pump to said second chamber;

wherein said housing of said control valve defines therein a stepped cylinder bore having a large-diameter bore and a small-diameter bore co-axially communicated with said large-diameter bore, and wherein said piston comprises a large-diameter portion axially slidably disposed within said large-diameter bore to form said second chamber therein, and a small-diameter portion axially slidably disposed within said small-diameter bore to form said first chamber therein;

wherein said control valve further comprises a spring for biasing said piston away from said valve seat;

wherein said piston defines therein a valve chamber opening at least to said first chamber, said valve member being axially slidably disposed within said valve chamber and biased by a second spring toward said valve seat, and wherein a retainer is secured to said piston and arranged to hold said valve member axially movable and retain said valve member within said valve chamber.

4. An anti-skid apparatus for an automotive vehicle as set forth in claim 3, wherein said valve seat is provided with at least one cutout for forming said restrictor with said valve member to allow a restricted flow of a brake fluid to said changeover valve when said valve member is seated on said valve seat.

5. An anti-skid apparatus for an automotive vehicle as set forth in claim 4, wherein said piston is provided with a check valve for allowing a flow of said pumped brake fluid into said first chamber through said valve chamber and blocking a flow of the brake fluid from said first chamber to said second chamber.

6. An anti-skid apparatus for an automotive vehicle as set forth in claim 5, wherein said control valve further comprises a seat member disposed within said first chamber, said seat member being formed therein a through hole communicating with said changeover valve and having an open end opening to said first chamber, and said seat member being formed with said valve seat aroun said open end of said through hole of said seat member.

7. An anti-skid apparatus for an automotive vehicle as set forth in claim 5, wherein said valve chamber defined in said piston opens to said second chamber and wherein said check valve comprises a second valve member accommodated in said valve chamber and seated on an open end thereof, said second spring being mounted between said valve member and said second valve member within said valve chamber.

8. An anti-skid apparatus for an automotive vehicle as set forth in claim 3, wherein said control valve further comprises a second valve seat formed around another open end of said primary fluid passage opening to said first chamber.

9. An anti-skid apparatus for an automotive vehicle as set forth in claim 8, wherein said retainer has a hole communicating with said valve chamber and a contact surface therearound seatable on said second valve seat, and wherein said valve member includes a protrusion extending through said hole of said retainer in spaced relationship therewith and seatable on said valve seat, said valve member and said retainer being normally placed away from said valve seat and said second valve seat respectively and seated thereon to form restrictors in said primary fluid passage when said pumped brake fluid is supplied from said fluid pump to said second chamber.

10. An anti-skid apparatus for an automotive vehicle as set forth in claim 9, wherein said first chamber in said housing is communicated with said changeover valve disposed in said primary fluid passage through said valve seat and said master cylinder is communicated with said first chamber through said second valve seat, and wherein said first chamber is communicated with a second changeover valve disposed in said primary fluid passage.

11. An anti-skid apparatus for an automotive vehicle as set forth in claim 10, wherein said valve seat is formed with a first cutout for forming said restrictor with said valve member to allow a restricted flow of a brake fluid from said first chamber to said changeover valve when said valve member is seated on said valve seat, and wherein said second valve seat is formed with a second cutout for forming said restrictor with said retainer to allow a restricted flow of the brake fluid from said master cylinder to said first chamber when said retainer is seated on said second valve seat.

12. An anti-skid apparatus for an automotive vehicle as set forth in claim 11, wherein said piston is provided with a check valve for allowing a flow of said pumped brake fluid into said first chamber through said valve chamber and blocking a flow of the brake fluid from said first chamber to said second chamber.

13. An anti-skid apparatus for an automotive vehicle as set forth in claim 12, wherein said second valve seat is formed with a third cutout to allow a restricted flow of the brake fluid from said first chamber to said second changeover valve when said retainer is seated on said second valve seat.

14. An anti-skid apparatus for an automotive vehicle as set forth in claim 13, wherein said valve chamber opens to said second chamber, and wherein said check valve comprises a second valve member accommodated in said valve chamber and seated on an open end thereof, said second spring being mounted between said valve member and said second valve member within said valve chamber.

15. An anti-skid apparatus for an automotive vehicle as set forth in claim 13, wherein said control valve further comprises a seat member disposed within said first chamber, said seat member being formed therein a first through hole communicating with said changeover valve and opening to said first chamber and a second through hole communicating with said master cylinder and opening to said first chamber, and said seat member being formed with said valve seat around an open end of said first through hole and second valve seat around an open end of said second through hole.

* * * * *